UNITED STATES PATENT OFFICE.

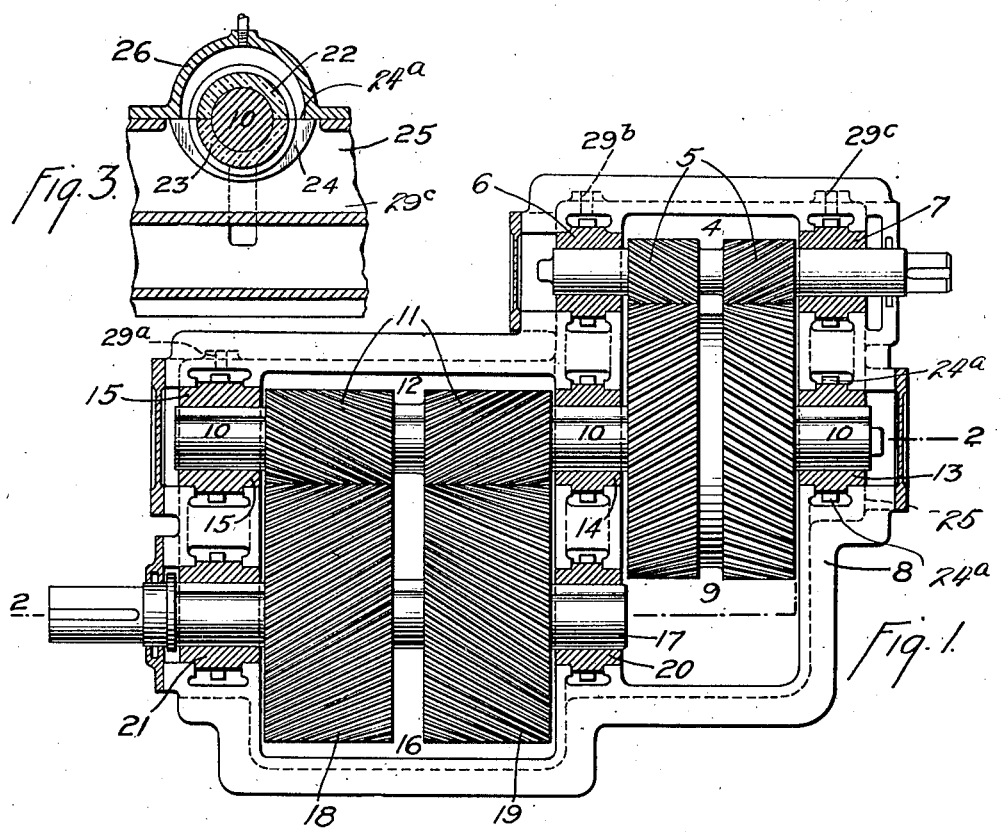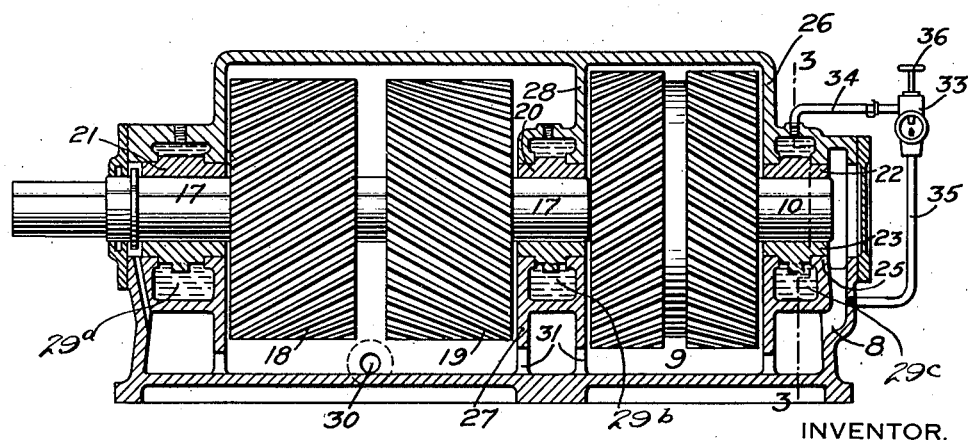

JAMES A. DAVIES, OF SWISSVALE, PENNSYLVANIA, ASSIGNOR, BY MESNE ASSIGN-MENTS, TO WESTINGHOUSE GEAR AND DYNAMOMETER COMPANY, OF EAST PITTS-BURGH, PENNSYLVANIA, A CORPORATION OF PENNSYLVANIA.

DOUBLE REDUCTION-GEARING.

1,293,047.  Specification of Letters Patent.  Patented Feb. 4, 1919.

Application filed April 4, 1916. Serial No. 88,847.

*To all whom it may concern:*

Be it known that I, JAMES A. DAVIES, a subject of the King of Great Britain and Ireland, and a resident of Swissvale, in the county of Allegheny and State of Pennsylvania, have made a new and useful Invention in Double Reduction-Gearing, of which the following is a specification.

This invention relates to reduction gearing and has for an object to produce a gearing capable of transmitting large power which is of simple construction and occupies less space than gears now in use and known to me having the same ratio of reduction and capable of transmitting substantially the same power.

A further object is to produce a double reduction gearing which is cheap to build, is more easily assembled and in which the parts are more accessible than in similar gears now in use and known to me.

These and other objects, which will be made apparent throughout the further description of the invention, are attained by means of gearing embodying the features herein described and illustrated.

In the drawings accompanying and forming a part hereof, Figure 1 is a plan view of a reduction gearing embodying my invention, the bearing being shown in section for convenience of illustration.

Fig. 2 is a sectional view along the line 2—2 of Fig. 1, and is illustrated in connection with the cover for the gear casing, which cover is not shown in Fig. 1.

Fig. 3 is a fragmental sectional view along the line 3—3 of Fig. 2 and illustrates a bearing construction forming a detail of the invention.

The apparatus illustrated includes a pinion 4, provided with two sets of oppositely inclined spur teeth 5. The pinion is journaled in bearings 6 and 7, which are mounted on a frame 8. This frame is so constructed that it forms the lower portion of a casing for the gears. The pinion meshes with a gear 9, which is also shown provided with two sets of oppositely inclined spur teeth. The gear 9 is rigidly mounted on a shaft 10, which is provided with two sets of oppositely inclined spur teeth 11, which form a pinion 12. The shaft 10 is journaled in three alined bearings 13, 14 and 15, which are mounted on the frame 8. A gear 16 meshes with the pinion 11 and is mounted on a shaft 17. The gear 16 may be formed in two parts 18 and 19, as illustrated, each mounted on the shaft 17 and each meshing with one set of the gear teeth 11 of the pinion 12. The shaft 17 is journaled in bearings 20 and 21, which are mounted on the frame 8.

With this arrangement the mounting shafts of all the gears are parallel and are journaled in a single frame. While there are seven bearings, they are so arranged that they may be bored with but three settings of the boring machine. One of the principal features of the invention is that the pinion 12 and the gear 9 are mounted on the same shaft. This avoids the necessity of employing a coupling between the pinion and the gear and also avoids the necessity of alining the two, since the borings of the bearings 13, 14 and 15, in a single operation, insures their correct alinement.

The bearings employed in the gearing illustrated are similar to the bearings shown in Fig. 3. Each bearing sleeve is formed in two semi-cylindrical portions 22 and 23. The lower portion 23 is supported, at each end, by the frame 8, and is provided intermediate its ends with a positioning flange 24 which projects downwardly between the two supporting pads 25 (Fig. 3) formed on the frame. The flange 24 terminates at each side of the portion 23 in a flat radial face which is flush with the radial face of the portion 23. The flange is also extended on each side of the portion 23 to form laterally projecting lugs which are engaged by a cover portion 26, adapted to be secured to the frame 8. With this arrangement each half bearing sleeve is held securely in place and is prevented from turning. The top portion of each bearing box is formed integrally with a cover 26, and is provided with bearing pads similar to the bearing pads 25 of the frame 8. With this arrangement all of the bearing sleeves are held securely in place when the cover 26 is bolted in place on the frame 8.

The frame 8 and consequently the cover 26 are respectively provided with partitions 27 and 28. The bearings 6, 14 and 20 are mounted on the partition 27, and the partition 28 coöperates with it in holding the bearing sleeves in place and in forming oil chambers for each bearing.

As illustrated, the frame 8 is provided with three lubricant delivery passages, 29ª, 29ᵇ and 29ᶜ, each of which extends across the frame portion and communicates with the bearings boxes formed integrally within the frame and the cover. The passage 29ª communicates with the bearings 15 and 21; the passage 29ᵇ communicates with the bearings 6, 14 and 20, and the passage 29ᶜ communicates with the bearings 7 and 13. As illustrated in Figs. 2 and 3, each bearing box is so formed as to provide a lubricant chamber which surrounds the bearing sleeve located within it. With this arrangement each bearing is adequately lubricated and the lubricant overflowing from the bearings drops into the frame 8, which is provided with a discharge port 30. As illustrated, the partition 27 is provided with a passage 31 which permits the lubricant collected on one side of it being drained off through the port 30.

In order to insure proper lubrication of each bearing, I provide each of the lubricant passages 29 with an indicator which visibly discloses the fact that a sufficient quantity of lubricant is delivered to the passage to fill the lubricant chambers communicating with it. As shown in Fig. 2, each indicator comprises a sight feed 33, which receives lubricant from the top of one of the lubricant chambers through a pipe 34 and delivers lubricant back to the frame 8 through a pipe 35. The lubricant delivered by the pipe 35 finds its way into the bottom of the frame and is eventually drained off through the port 30. If desired, the sight feed 33 may be provided with a shut-off valve 36 so as to prevent a constant dripping of oil.

While I have referred to the members 4 and 12 as pinions, this has been done merely for convenience of description and with no intention of limiting the scope of the invention. It will also be apparent to those skilled in the art that each gear illustrated may be provided with a single set of straight gear teeth, or with any number of sets of teeth of any configuration without departing from the spirit and scope of the invention. It will also be apparent that various changes, both in the details of construction and the location of the various elements may be made without departing from the spirit and scope of the invention as set forth by the appended claims.

What I claim is:

1. In a reduction gearing, a pinion, a gear meshing therewith, a second pinion mounted on the shaft of said gear, a second gear meshing with the second pinion, and a frame on which said pinions and gears are journaled and having an intermediate wall for supporting an intermediate bearing between the first mentioned gear and the second pinion.

2. In a reduction gearing, a pinion, a gear meshing therewith, a second pinion mounted on the shaft of said gear, a second gear meshing with the second pinion, a frame, and three alined bearings mounted on said frame for the shaft of said first mentioned gear and said second pinion.

3. In a reduction gearing, a pinion, a gear meshing therewith, a second pinion on the shaft of said gear, a second gear meshing with said second pinion, a frame, three alined bearings for the shaft of the first gear and the second pinion mounted on said frame, and bearings for the first pinion and second gear mounted on said frame.

4. In a reduction gearing, a pinion adapted to be connected with a driving agent, a gear meshing with said pinion, a second pinion mounted on the shaft of the gear, a second gear meshing with the second pinion, a frame forming the lower portion of a casing for said gears and pinions, and having a partition extending at right angles to the shafts of said gears and pinions, bearings for said gears and pinions, one bearing for each gear and pinion being mounted on said partition, and a cover adapted to be secured to said frame and to inclose said gears and pinions.

5. In a reduction gearing, a pinion adapted to be connected with a driving agent, a gear meshing with said pinion, a second pinion mounted on the shaft of the gear, a second gear meshing with the second pinion, a frame forming the lower portion of a casing for said gears and pinions, and having a partition extending at right angles to the shafts of said gears and pinions, bearings for said gears and pinions, one bearing for each gear and pinion being mounted on said partition, and a cover for the frame adapted to be secured thereto and to coöperate therewith in forming bearing boxes for the said bearings.

6. In a reduction gearing, two sets of intermeshing gears, one gear of one set being mounted on the shaft of one gear of the other set, a frame forming the lower portion of a casing for said gears, on which said gears are journaled and having lubricant delivery passages and chambers formed therein for delivering lubricant to the journals of said gears, and a cover adapted to be secured to said frame and to inclose said gears, said cover having lubricant chambers formed therein which coöperate with the lubricant chambers formed in the frame in inclosing the journals.

7. In a reduction gearing, two sets of intermeshing gears, one gear of one set being mounted on the shaft of one gear of the other set, a horizontally divided casing inclosing the gears and provided with bearing supporting walls in the lower portion thereof, lubricant conduits formed in said walls, and lubricant chambers communicating with the lubricant conduits and inclosing each bearing.

8. In a reduction gearing, a set of intermeshing gears having parallel shafts, a lower casing element provided with gearing supporting walls each supporting one end of the shafts, detachable bearings seated in the walls, lubricant chambers formed in the walls around the bearings, an upper casing element for coöperating with the lower casing element for retaining the bearings in a fixed position, lubricant chambers formed in the upper casing element for coöperating with the lubricant chambers in the lower casing element in delivering lubricant to the bearings and lubricant conduits in the walls communicating with the lubricant chambers through which lubricant is supplied to the elements.

In testimony whereof, I have hereunto subscribed my name this 3rd day of April, 1916.

JAMES A. DAVIES.